United States Patent
Nakajima et al.

(10) Patent No.: US 9,335,689 B2
(45) Date of Patent: May 10, 2016

(54) POLYIMIDE TUBE, METHOD FOR PRODUCING SAME, AND FIXING BELT

(71) Applicants: SUMITOMO ELECTRIC INDUSTRIES, LTD., Osaka-shi, Osaka (JP); SUMITOMO ELECTRIC FINE POLYMER, INC., Sennan-gun, Osaka (JP)

(72) Inventors: Shingo Nakajima, Osaka (JP); Jun Sugawara, Osaka (JP); Yoshitaka Ikeda, Sennan-gun (JP); Daisuke Shoji, Sennan-gun (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 370 days.

(21) Appl. No.: 14/111,190

(22) PCT Filed: Nov. 14, 2012

(86) PCT No.: PCT/JP2012/079478
§ 371 (c)(1),
(2) Date: Oct. 11, 2013

(87) PCT Pub. No.: WO2013/080793
PCT Pub. Date: Jun. 6, 2013

(65) Prior Publication Data
US 2014/0127513 A1 May 8, 2014

(30) Foreign Application Priority Data
Nov. 29, 2011 (JP) ................................. 2011-260650

(51) Int. Cl.
*B29C 41/00* (2006.01)
*B29D 23/00* (2006.01)
(Continued)

(52) U.S. Cl.
CPC .......... *G03G 15/2057* (2013.01); *B28B 11/048* (2013.01); *B32B 1/08* (2013.01); *B32B 27/08* (2013.01); *B32B 27/281* (2013.01);
(Continued)

(58) Field of Classification Search
None
See application file for complete search history.

(56) References Cited

U.S. PATENT DOCUMENTS

2010/0051423 A1* 3/2010 Kim .................... G03G 15/0435
198/846
2010/0055365 A1* 3/2010 Nakajima ............. B29C 41/085
428/36.9

FOREIGN PATENT DOCUMENTS

| JP | H05-40425 A | 2/1993 |
| JP | H08-80580 A | 3/1996 |

(Continued)

*Primary Examiner* — Ramsey Zacharia
(74) *Attorney, Agent, or Firm* — Drinker Biddle & Reath LLP (57) ABSTRACT

Provided are a polyimide tube that can be produced at a low cost and has good durability and a good offset property, a method for producing the polyimide tube, and a fixing belt which includes the polyimide tube as a base and which has good durability and a good offset property. Provided are a polyimide tube including a base resin containing a polyimide resin having good rigidity and a soft polyimide resin having good flexibility in a mass ratio of 30:70 to 70:30, 20% to 50% by volume of graphite, 3% by volume or more of a highly conductive carbon black particle, and 0.5% by volume or more of a carbon nanotube relative to the volume of the base resin, a method for producing the polyimide tube, and a fixing belt including the polyimide tube as a base.

6 Claims, 2 Drawing Sheets

(51) Int. Cl.

| | | |
|---|---|---|
| *B32B 1/08* | (2006.01) | |
| *B32B 27/08* | (2006.01) | |
| *B32B 27/18* | (2006.01) | |
| *G03G 15/20* | (2006.01) | |
| *C08L 79/08* | (2006.01) | |
| *C08G 73/10* | (2006.01) | |
| *B28B 11/04* | (2006.01) | |
| *F16L 9/127* | (2006.01) | |
| *B32B 27/28* | (2006.01) | |

(52) U.S. Cl.
CPC .......... *C08G73/105* (2013.01); *C08G 73/1067* (2013.01); *C08G 73/1071* (2013.01); *C08L 79/08* (2013.01); *F16L 9/127* (2013.01); *G03G 15/20* (2013.01); *B29C 41/00* (2013.01); *B29D 23/00* (2013.01); *B32B 27/18* (2013.01); *B32B 2270/00* (2013.01); *B32B 2597/00* (2013.01); *C08K 2201/011* (2013.01); *C08K 2201/014* (2013.01); *C08L 2205/02* (2013.01); *Y10T 428/31504* (2015.04)

(56) References Cited

FOREIGN PATENT DOCUMENTS

| | | |
|---|---|---|
| JP | 2003-246927 A | 9/2003 |
| JP | 2004-123867 A | 4/2004 |
| JP | 2004-195989 A | 7/2004 |
| JP | 2009-156965 A | 7/2009 |
| WO | WO-2008/044643 A1 | 4/2008 |
| WO | WO-2009/081630 A1 | 7/2009 |
| WO | WO-2010/150908 A1 | 12/2010 |

\* cited by examiner

POLYIMIDE TUBE, METHOD FOR PRODUCING SAME, AND FIXING BELT

TECHNICAL FIELD

The present invention relates to a polyimide tube used in, for example, production of a fixing belt of an image-forming apparatus. More specifically, the present invention relates to a polyimide tube that has a high mechanical strength such as folding endurance, and that is less likely to accumulate static electricity and thus less likely to cause an offset phenomenon when used in a fixing belt. The present invention also relates to a method for producing the polyimide tube and a fixing belt including the polyimide tube as a belt base.

BACKGROUND ART

In general, in image-forming apparatuses such as a copying machine and a laser beam printer using electrophotography, an image-forming process is performed in which a toner image is formed on a transfer-receiving material (such as recording paper) through an exposure step, a developing step, and a transfer step, and the toner image is then fixed. In a widely used fixing method, a transfer-receiving material having an unfixed toner image thereon is caused to pass between a fixing roller and a pressure roller, is pressed between the two rollers, and is heated by a heating source provided in the fixing roller.

As the fixing roller, for example, PTL 1 discloses a steel use stainless (SUS) tube. However, such an SUS tube has problems in terms of cost because the material cost and the processing cost thereof are high. Furthermore, an SUS tube has poor flexibility and has a problem in that, for example, cracks are easily generated at an end or another portion of the tube when paper jamming or the like occurs. To address these problems, a tube composed of a heat-resistant resin, in particular, a polyimide tube including a base composed of a polyimide resin, which has good heat resistance, mechanical strength, etc., has been proposed. An endless belt (fixing belt) including a polyimide tube having flexibility and a fluororesin layer for providing a releasing property, the fluororesin layer being disposed on the external surface of the polyimide tube, has been widely used.

Figure 1:
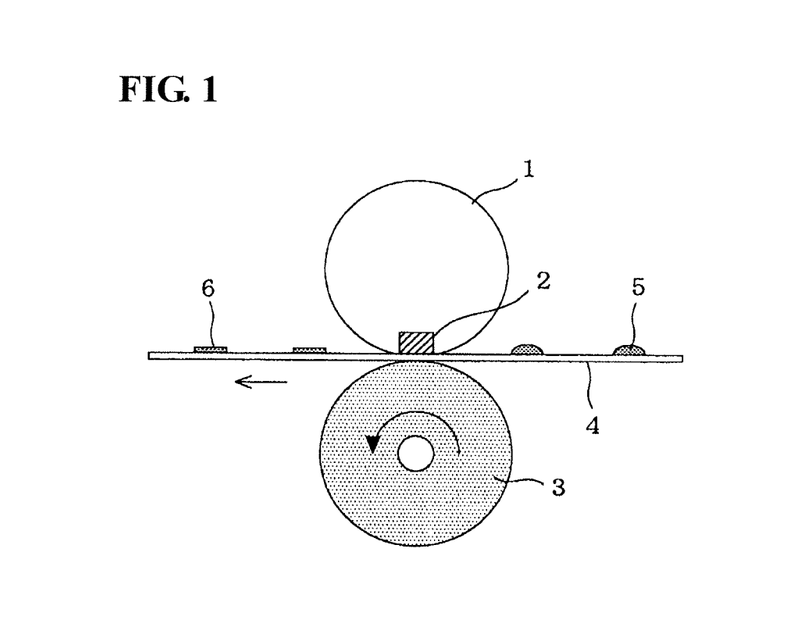
FIG. 1 is a view illustrating a fixing method using a fixing belt.

FIG. 1 is s cross-sectional view that schematically illustrates a fixing step using such a fixing belt. As illustrated in the figure, an unfixed toner image 5 on a transfer-receiving material 4 is heated by heating means (a heater) 2 through a fixing belt 1, and is fixed by applying a pressure with a pressure roller 3 to form a fixed toner image 6.

In order to reduce the waiting time after a power supply is turned on, to reduce the electric power consumption, to realize a high fixing speed, to realize a low fixing temperature, etc., high thermal conductivity is desired for the fixing roller. To improve the thermal conductivity, blending a thermally conductive inorganic filler in a polyimide tube has been proposed.

For example, PTL 2 discloses a fixing belt including an inner layer which is a tube composed of a polyimide containing an inorganic filler having high thermal conductivity, and a fluororesin layer disposed on the external surface of the inner layer. Boron nitride (BN) and other compounds are described as specific examples of the inorganic filler.

Regarding a polyimide tube used for a fixing roller, PTL 3 also discloses an example in which a polyimide containing BN and a needle-like, inorganic, thermally conductive filler is used, and PTL 4 discloses an example of a tube composed of a polyimide containing a needle-like, inorganic, thermally conductive filler, in which the needle-like, inorganic, thermally conductive filler is oriented in the circumferential direction of the tube. Furthermore, PTL 5 discloses a polyimide tube in which a needle-like, inorganic, thermally conductive filler oriented in the circumferential direction is dispersed in an amount of 15% by volume or more, and a method for producing the polyimide tube, in which a dispenser method is used.

CITATION LIST

Patent Literature

PTL 1: Japanese Unexamined Patent Application Publication No. 5-40425
PTL 2: Japanese Unexamined Patent Application Publication No. 8-80580
PTL 3: International Publication No. WO08/044,643
PTL 4: Japanese Unexamined Patent Application Publication No. 2004-195989
PTL 5: Japanese Unexamined Patent Application Publication No. 2009-156965

SUMMARY OF INVENTION

Technical Problem

For a polyimide tube used for a fixing roller, in addition to good heat resistance, mechanical strength, thermal conductivity, and the like, good durability that can withstand long-term use and a good image property (offset property) for obtaining a sharp image are desired. Herein, the term "offset property" refers to a property for preventing an offset phenomenon that occurs when a toner image is fixed by heat. The term "offset phenomenon" refers to a phenomenon in which part of a toner is transferred onto a fixing belt and is returned onto transfer paper after the fixing belt goes round, thereby forming a ghost image.

The polyimide tube described in PTL 5 exhibits a good offset property in addition to a good mechanical strength, etc. However, in order to sufficiently obtain these effects, it is necessary to blend expensive fillers such as a carbon nanotube (CNT) and BN in large amounts and in an oriented manner, which results in a problem in terms of production cost. Furthermore, in recent years, the number of cases where an excellent image property is desired has been increasing, and a further improvement of the image property has been desired.

An object of the present invention is to provide a polyimide tube that can be produced at a low cost by, for example, using an inexpensive filler and reducing the amount of expensive filler, such as a CNT, added, and that has good durability and a good offset property. Another object of the present invention is to provide a method for producing the polyimide tube. Still another object of the present invention is to provide a fixing belt including the polyimide tube as a base and having good durability and a good offset property.

Solution to Problem

As a result of intensive studies in order to solve the problems described above, the inventor of the present invention found the following: By reducing the electrical resistance of a polyimide tube to prevent static electricity from being accumulated, the offset property is improved. In addition, by blending graphite and highly conductive carbon black particles in the polyimide tube, the electrical resistance can be reduced and a good offset property is obtained even when the amount of CNT or the like blended is small. Furthermore, the inventor of the present invention found the following: By using, as a base resin, a polyimide containing a polyimide having high flexibility in a particular range, high folding endurance is obtained even in the case where graphite and highly conductive carbon black particles are blended in large amounts, and as a result, durability is also increased when the polyimide tube is used in an actual apparatus. These findings led to the completion of the present invention.

A first embodiment of the present invention is a polyimide tube including a base resin containing a polyimide resin A including, as a main constitutional unit, a repeating unit represented by formula (A) below:

[Chem. 1]

(A)

and a polyimide resin B including, as a main constitutional unit, a repeating unit represented by formula (B) below:

[Chem. 2]

(B)

and/or a polyimide resin C including, as a main constitutional unit, a repeating unit represented by formula (C) below:

[Chem. 3]

(C)

in which a ratio (polyimide resin A):(polyimide resin B+polyimide resin C) is 30:70 to 70:30 in terms of mass ratio;

20% to 50% by volume of graphite; 3% by volume or more of a highly conductive carbon black particle; and 0.5% by volume or more of a CNT relative to the volume of the base resin.

This polyimide tube has a low electrical resistance, and thus accumulation of static electricity in the polyimide tube is suppressed. Therefore, a good offset property is obtained.

Furthermore, this polyimide tube has high folding endurance and exhibits high durability when the polyimide tube is used in an actual apparatus.

This polyimide tube includes a base resin containing the polyimide resin A and the polyimide resin B and/or the polyimide resin C, in which these polyimide resins are contained in the mass ratio described above. More specifically, the polyimide resin A and the polyimide resin B may be contained in a mass ratio of polyimide resin A:polyimide resin B=30:70 to 70:30. Alternatively, the polyimide resin A and the polyimide resin C may be contained in a mass ratio of polyimide resin A:polyimide resin C=30:70 to 70:30. Alternatively, both the polyimide resin B and the polyimide resin C may be contained, and a ratio of the mass of the polyimide resin A to the mass of the total of the polyimide resin B and the polyimide resin C may be 30:70 to 70:30.

The polyimide resin A, the polyimide resin B, and the polyimide resin C respectively include, as main constitutional units, the repeating units represented by formula (A), formula (B), and formula (C). The phrase "has as a main constitutional unit" means that the polyimide resin is constituted by only the repeating unit represented by the above corresponding formula, or that the polyimide resin is a copolymer in which the repeating unit represented by the above corresponding formula accounts for the maximum proportion and another constitutional unit may also be included as long as the object of the present invention is not impaired. The base resin may be constituted by only the polyimide resin A and polyimide resin B and/or the polyimide resin C, but may contain another resin as long as the object of the present invention is not impaired.

The polyimide resin A is a polyimide resin having good rigidity. The polyimide resin B and the polyimide resin C are soft polyimide resins having good flexibility. The polyimide tube of the present invention is obtained by mixing such a polyimide resin having good rigidity and a soft polyimide resin having good flexibility in a particular ratio. As a result, good folding endurance is obtained even in the case where an inorganic filler such as graphite is blended in a large amount. When the ratio of the soft polyimide resin having good flexibility is less than 30% by mass or exceeds 70% by mass relative to the total amount of the polyimide resins, the folding endurance decreases.

Furthermore, the polyimide tube of the present invention is obtained by blending, in the base resin described above, 20% to 50% by volume of graphite, 3% by volume or more of a highly conductive carbon black particle, and 0.5% by volume or more of a CNT on a basis of the volume of the base resin. By blending the graphite, the highly conductive carbon black particle, and the CNT in the above ratios, the resistance of the polyimide tube can be reduced, and as a result, a good offset property is obtained. When the blending ratio of the graphite exceeds 50% by volume, folding endurance decreases. It is believed that the highly conductive carbon black particle and the CNT can be blended in an amount of up to about 20% by volume. However, considering the production cost of the polyimide tube, the blending ratio of the highly conductive carbon black particle is preferably about 15% by volume or less and the blending ratio of the CNT is preferably about 3% by volume or less.

The particle size of the graphite is not particularly limited. For example, graphite particles having a particle size in the range of about 3 to 30 μm can be used. Either α-graphite or β-graphite can be used.

The term "highly conductive carbon black particle" refers to a carbon black particle in which a mixture prepared by mixing the carbon black particle with a high-density polyethylene resin in an amount of 10% by mass can have a volume resistance of 20 Ω·cm or less. For example, a hollow shell-shaped furnace black particle commercially available under the trade name of Ketjenblack (manufactured by Ketjenblack International Corporation) can be used as such a carbon black particle.

Carbon nanotubes (CNTs) are each composed of nano-sized cylindrical carbon. A CNT having an aspect ratio of about 50 to 1,000 and a graphite structure is preferably used as the CNT. Either a single-wall CNT or a multi-wall CNT whose inside has a concentric ring structure can be used. Considering the cost, a multi-wall CNT is preferable. The method for producing a CNT is not particularly limited. However, an example of a preferred method is a vapor-phase growth method, by which the diameter of the CNT is easily controlled and which is good in terms of mass productivity.

The minor axis (diameter) of the CNT is usually 300 nm or less, and preferably 200 nm or less. The major axis (length) of the CNT is usually 50 μm or less, preferably 30 μm or less, and more preferably 20 μm or less. When the minor axis and the major axis of the CNT are excessively large, dispersibility of the CNT tends to decrease when the CNT is dispersed in a polyimide varnish. Consequently, the mechanical strength and thermal conductivity may decrease, and the surface smoothness may be impaired.

In the present invention, in addition to the graphite, the highly conductive carbon black particle, and the CNT, another inorganic filler may be added to the polyimide resin composition as long as the object of the present invention is not impaired. For example, in order to obtain a higher thermal conductivity, a highly thermally conductive filler such as BN may be added.

A second embodiment of the present invention is the polyimide tube according to the first embodiment of the present invention, in which the ratio polyimide resin A:(polyimide resin B+polyimide resin C) is 50:50 to 60:40 in terms of mass ratio. A mixing ratio of the polyimide resin having good rigidity to the soft polyimide resin having good flexibility in the range of 50:50 to 60:40 is preferable because higher folding endurance can be obtained.

A third embodiment of the present invention is the polyimide tube according to the first embodiment or the second embodiment of the present invention, in which 30% to 40% by volume of the graphite, 5% to 10% by volume of the highly conductive carbon black particle, and 1% to 3% by volume of the CNT are contained relative to the volume of the base resin. By controlling the blending ratio of the graphite to 30% to 40% by volume, the blending ratio of the highly conductive carbon black particle to 5% by volume or more, and the blending ratio of the CNT to 1% by volume or more, the electrical resistance of the polyimide tube can be further reduced and an excellent offset property can be obtained. In addition, by controlling the blending ratio of the highly conductive carbon black particle to 10% by volume or less and the blending ratio of the CNT to 3% by volume or less, the production cost of the polyimide resin can be suppressed, which is economically advantageous.

A fourth embodiment of the present invention is the polyimide tube according to any one of the first embodiment to the third embodiment of the present invention, having a thickness of 10 to 150 μm.

The thickness, the outer diameter, the length, etc. of the polyimide tube can be appropriately selected in accordance with a desired mechanical strength, the use, etc. In the case where the polyimide tube of the present invention is used as a base of a fixing belt of an electrophotographic image-forming apparatus, the polyimide tube has a thickness of usually 10 to 150 μm, preferably 20 to 120 μm, and more preferably 30 to 100 μm, and has an outer diameter of usually 5 to 100 mm and preferably 10 to 50 mm. The length of the polyimide tube can be appropriately determined in accordance with, for example, the size of a transfer-receiving material such as copy paper.

The polyimide tube of the present invention can be produced by any of the following methods. For example, a polyimide varnish dispersion liquid prepared by dissolving polyimide precursors (polyamic acids) and dispersing fillers such as graphite, highly conductive carbon black particles, and CNTs is formed into a film, the film is baked, and the resulting film is formed into a tube. Alternatively, a tubular film of such a polyimide varnish dispersion liquid is formed, and the tubular film is then baked. By conducting baking, an organic solvent is removed and the polyimide precursor is imidized to form a tube composed of a polyimide resin. Accordingly, the baking is conducted at a high temperature at which the polyimide precursor is imidized to produce a polyimide resin. An example of the organic solvent used in the polyimide varnish dispersion liquid is N-methylpyrrolidone.

An example of a method for forming a tubular film of a polyimide varnish dispersion liquid is a method (dispenser method) in which a polyimide varnish dispersion liquid is applied onto a surface of a columnar or cylindrical core body using a dispenser to form a coating layer.

A fifth embodiment of the present invention is a method for producing the above-described polyimide tube by using the dispenser method. Specifically, the method for producing the polyimide tube according to any one of the first embodiment to the fourth embodiment of the present invention includes:

a step of making/bringing a discharge opening of a supply portion of a dispenser close to/into contact with an outer surface (external surface) of a columnar core body or an outer surface or an inner surface (internal surface) of a cylindrical core body, and while rotating the core body and relatively moving the discharge opening in a direction of a rotational axis of the core body, forming a coating layer by continuously supplying a polyimide varnish dispersion liquid from the discharge opening onto the outer surface of the columnar core body or the outer surface or the inner surface of the cylindrical core body;

after the formation of the coating layer, a step of solidifying the coating layer; and after the solidification, a step of detaching the coating layer from the core body.

Here, the polyimide varnish dispersion liquid is prepared by dissolving polyimide precursors (polyamic acids) of the polyimide resin A, and the polyimide resin B, and/or the polyimide resin C and dispersing fillers such as graphite, highly conductive carbon black particles, and CNTs. The phrase "solidifying the coating layer" means a case where the coating layer is baked so that the polyimide precursors are subjected to an imidization reaction to produce polyimide resins. However, the phrase "solidifying the coating layer" may also mean a case where the imidization reaction does not proceed or insufficiently proceed as long as the coating layer is solidified to the extent that the coating layer can be detached from the core body.

According to this method for producing a polyimide tube using the dispenser method, a needle-like filler such as a CNT can be oriented in the circumferential direction. By increasing the degree of orientation of the needle-like filler in the circumferential direction, the compressive strength is improved and the offset property is improved also from this point. Furthermore, this method is advantageous in that the tensile strength is increased, and that, when the polyimide tube is used as a fixing belt, twist deformation, crushing by buckling, and the like can be suppressed during driving of the fixing belt.

The polyimide tube of the present invention can be used as a base of a fixing belt. The present invention provides, as a sixth embodiment, a fixing belt including a belt base including the polyimide tube of the present invention, and a fluororesin layer disposed on an outer circumferential surface of the belt base either directly or with an adhesive layer therebetween.

The belt base included in the fixing belt of the present invention may include only the polyimide tube of the present invention, that is, the polyimide tube having a low electrical resistance (low-resistance polyimide tube). Alternatively, the belt base may be a multilayered polyimide tube in which another polyimide tube is disposed on the inner layer side and/or the outer layer side of the low-resistance polyimide tube of the present invention as long as the object of the present invention is not impaired. Examples of embodiments of the fixing belt of the present invention include (1) a fixing belt including a belt base including only a low-resistance polyimide tube, and a fluororesin layer disposed on an external surface of the belt base, (2) a fixing belt including a belt base including a low-resistance polyimide tube and a common polyimide tube (a tube composed of a publicly known, common polyimide) disposed on the outer layer side of the low-resistance polyimide tube, and a fluororesin layer disposed on an external surface of the belt base (that is, on an external surface of the common polyimide tube), and (3) a fixing belt including a belt base including a low-resistance polyimide tube and a common polyimide tube disposed on the inner layer side of the low-resistance polyimide tube, and a fluororesin layer disposed on an external surface of the belt base (that is, on an external surface of the low-resistance polyimide tube).

The belt base preferably includes two layers composed of a low-resistance polyimide and a common polyimide because durability can be further increased while maintaining a good offset property and a good image property. As described above, the low-resistance polyimide tube may be disposed on either the inner side or the outer side of the belt base. However, since a component such as a heater is disposed on the inner side, in general, a common polyimide tube having a good abrasion resistance is preferably disposed on the inner side and the low-resistance polyimide tube is preferably disposed on the outer side.

The fixing belt of the present invention can be produced by a method in which a fluororesin varnish is applied onto an outer circumferential surface of a belt base including the low-resistance polyimide tube of the present invention and is baked at a high temperature. The polyimide tube of the present invention has heat resistance that can withstand this baking at a high temperature. The fixing belt of the present invention is suitable for use in, for example, a fixing unit of an electrophotographic image-forming apparatus.

Advantageous Effects of Invention

The polyimide tube of the present invention can be produced at a low cost and has good durability and a good offset property. This polyimide tube having these good properties can be produced by the method for producing a polyimide tube of the present invention. Furthermore, the fixing belt of the present invention, which includes the polyimide tube as a base, is a fixing belt having good durability and a good offset property, and is suitable for use in, for example, a fixing unit of an electrophotographic image-forming apparatus.

DESCRIPTION OF EMBODIMENTS

Specific embodiments of the present invention will now be described. Note that the present invention is not limited to the embodiments below.

The polyimide resin A, the polyimide resin B, and the polyimide resin C that are used in the present invention may each be a homopolymer including only the repeating unit represented by the above corresponding formula. Alternatively, the polyimide resin A, the polyimide resin B, and the polyimide resin C may each be a copolymer that includes not only the repeating unit represented by the above corresponding formula as a constitutional unit in the maximum proportion but also another constitutional unit (as long as the object of the present invention is not impaired). In order to obtain a homopolymer of the polyimide resin A, a polyimide precursor is synthesized using 3,3',4,4'-diphenyltetracarboxylic dianhydride and p-phenylenediamine as monomers, and the polyimide precursor is then imidized. In order to obtain a homopolymer of the polyimide resin B, a polyimide precursor is synthesized using 3,3',4,4'-diphenyltetracarboxylic dianhydride and 4,4'-diaminodiphenyl ether as monomers, and the polyimide precursor is then imidized. In order to obtain a homopolymer of the polyimide resin C, a polyimide precursor is synthesized using pyromellitic dianhydride and 4,4'-diaminodiphenyl ether as monomers, and the polyimide precursor is then imidized. In the synthesis of the polyimide precursor, the dianhydride component and the diamine component are used in a substantially equimolar ratio.

In the case where the polyimide resin A is a copolymer, examples of the other constitutional unit include a constitutional unit represented by formula (F) below:

[Chem. 4]

(F)

and a constitutional unit represented by formula (G) below:

[Chem. 5]

(G)

In the case where the polyimide resin B is a copolymer, an example of the other constitutional unit is a constitutional unit represented by formula (D) below:

[Chem. 6]

(D)

In the case where the polyimide resin C is a copolymer, an example of the other constitutional unit is a constitutional unit represented by formula (E) below:

[Chem. 7]

(E)

Figure 2:
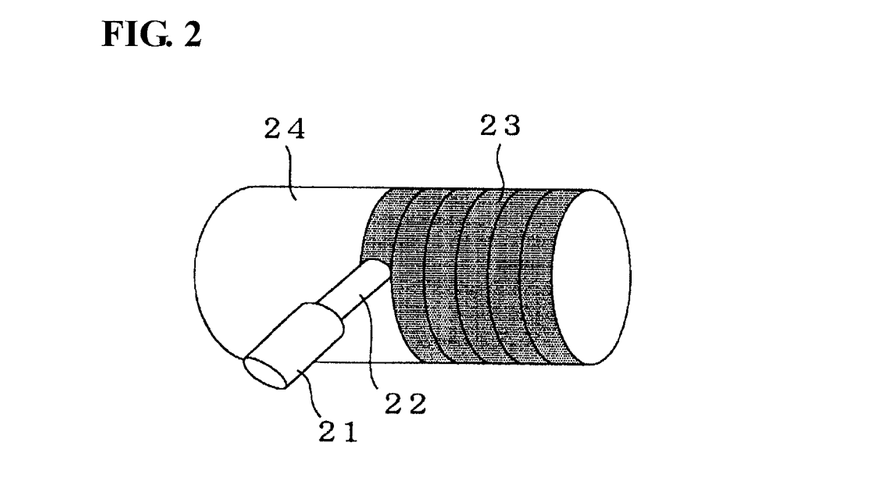
FIG. 2 is a view illustrating a method of application using a dispenser method.

FIG. 2 is a view illustrating a dispenser method used in the production method of the present invention. As illustrated in FIG. 2, a polyimide varnish dispersion liquid is continuously supplied from a supply portion 21 of a dispenser onto an outer surface of a columnar core body 24 while rotating the columnar core body 24 in a circumferential direction. A discharge opening 22 of the supply portion is brought into contact with the outer surface of the core body 24. Note that a cylindrical core body may be used as the core body instead of the columnar core body 24. In this case, the polyimide varnish dispersion liquid can be supplied to the outer surface of the core body, as in the case illustrated in FIG. 2. Alternatively, the discharge opening of the supply portion of the dispenser may be brought into contact with the inside of the core body, and the polyimide varnish dispersion liquid may be supplied to the inner surface of the core body.

When the polyimide varnish dispersion liquid is continuously supplied from the discharge opening 22 of the supply portion 21 of the dispenser and the supply portion 21 is relatively moved in a direction of the rotational axis of the core body, the supplied polyimide varnish dispersion liquid is applied in a spiral manner to form a coating layer 23. In general, the supply portion 21 of the dispenser is moved in the direction of the rotational axis of the core body 24. Alternatively, the core body 24 may be moved in the direction of the rotational axis thereof with respect to the supply portion 21 of the dispenser while rotating the core body 24. The rotational speed and the speed of the movement are determined so that the polyimide varnish dispersion liquid is applied onto the surface of the core body 24 without gaps and adjacent portions of the polyimide varnish dispersion liquid applied in a spiral manner are combined with each other to form a uniform coating layer. The discharge opening 22 of the supply portion of the dispenser is usually a nozzle.

After this application step, the polyimide varnish dispersion liquid is cured (imidized) by heating using a common method, thus forming a strong, thin, tubular film. Subsequently, the tube is taken out (detached) from the core body. Thus, a polyimide tube can be obtained. Alternatively, after the application step, a tube, that is, a coating layer which is solidified to the extent that the coating layer has a strength sufficient to at least maintain the structure of a tube without being completely imidized may be taken out (detached) from the surface of the core body, and the tube may be cured (imidized) by heating after the detachment.

A polyimide precursor (also referred to as a "polyamide acid" or "polyamic acid") has a carboxyl group and an amide group at adjacent positions of an aromatic ring. The term "imidization" refers to a reaction in which these carboxyl group and amide group are subjected to dehydration/ring-closure to produce a polyimide. Imidization is conducted by heating the polyimide precursor to a maximum temperature of 350° C. to 450° C.

The polyimide varnish dispersion liquid used in this production method is a polyimide varnish containing, as solid components, a polyimide precursor and fillers such as graphite, highly conductive carbon black particles, and CNTs. Examples of the organic solvent that dissolves the polyimide precursor and disperses the fillers include not only N-methylpyrrolidone mentioned above but also dimethylacetamide (DMAc) and dimethylformamide (DMF).

The polyimide varnish dispersion liquid has a viscosity of preferably 100 to 15,000 poise, and more preferably 100 to 3,000 poise at 25° C. When the viscosity of the polyimide varnish dispersion liquid is excessively high, portions of the polyimide varnish dispersion liquid applied in a spiral manner, the portions contacting and combining with each other, have a thickness smaller than other portions, resulting in the formation of irregularities on the surface of the coating layer. When the viscosity of the polyimide varnish dispersion liquid is excessively low, dripping or repelling of the dispersion liquid occurs during application or drying, resulting in a difficulty in forming a tube. By adjusting the viscosity of the polyimide varnish dispersion liquid, the dripping and repelling are prevented, and, after the application, the coating liquid is moved by gravity or a centrifugal force to form a smooth liquid surface, and thus a flat coating layer having no irregularities thereon can be formed.

Examples of the material of the core body include metals such as aluminum, aluminum alloys, iron, and stainless steels; ceramics such as alumina and silicon carbide; and heat-resistant resins such as polyimides, polyamide-imides, polybenzimidazoles, and polybenzoxazoles.

In order to improve the releasing property of the core body, a release agent composed of silicone oil or the like is preferably applied onto the core body, or the core body is preferably coated with a ceramic.

A stripe pattern or irregularities of a coating film may be formed along a spiral coating path. However, since the discharge opening of the supply portion of the dispenser is in contact with a polyimide varnish dispersion liquid layer applied onto the core body in a spiral manner, and the relationship between the speed of the movement and the number of rotations of the core body can be adjusted, the formation of the stripe pattern and irregularities can be prevented by, for example, the effect of stirring the liquid in the vicinity of the discharge opening of the liquid.

A fluororesin for forming the fluororesin layer included in the fixing belt of the present invention preferably has good heat resistance so that the fixing belt can be continuously used at a high temperature. Specific examples thereof include polytetrafluoroethylene (PTFE), tetrafluoroethylene-perfluoroalkylvinylether copolymers (PFA), and tetrafluoroethylene-hexafluoropropylene copolymers (FEP).

Although the fluororesin layer can be formed by using only a fluororesin, an electrically conductive filler is preferably incorporated in the fluororesin layer in order to prevent offset due to charging. In the case where the fluororesin layer is bonded to a polyimide tube with an adhesive therebetween, similarly, in order to prevent offset, an electrically conductive filler may be incorporated in the adhesive layer functioning as an interlayer. The fluororesin layer is provided for the purpose of providing a releasing property to the fixing belt so that a toner on a transfer-receiving material such as recording paper does not adhere to the surface of the fixing belt. Examples of the electrically conductive filler include, but are not particularly limited to, electrically conductive carbon black such as a highly conductive carbon black particle and metal powders such as an aluminum powder.

The fluororesin layer can be formed by a method in which a varnish containing a fluororesin is applied onto a surface of a polyimide tube, and is baked. Alternatively, the fluororesin layer may be formed as follows: In a step of producing a polyimide tube, a tube that is solidified by drying and removing a solvent is produced. A varnish containing a fluororesin is applied onto the tube either directly or with an adhesive layer therebetween to form a fluororesin layer. Subsequently, baking of the fluororesin and heating of the polyimide tube are performed at the same time to imidize the tube. Alternatively, a method of covering a polyimide tube with a fluororesin tube may also be employed. The thickness of the fluororesin layer is usually about 1 to 30 µm, and preferably about 5 to 15 µm.

The fixing belt may include an adhesive layer as an interlayer so as to improve adhesiveness between the polyimide tube and the fluororesin layer. Examples of a resin constituting the adhesive layer include a mixture of a fluororesin and a polyamide-imide resin and a mixture of a fluororesin and a polyether sulfone resin.

Figure 3:
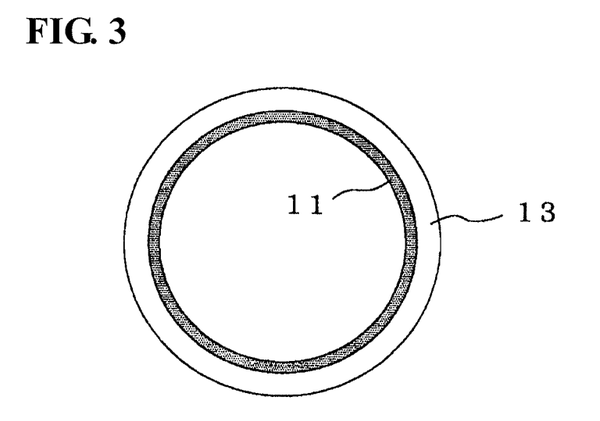
FIG. 3 is a cross-sectional view illustrating an example of a layer structure of a fixing belt.
Figure 4:
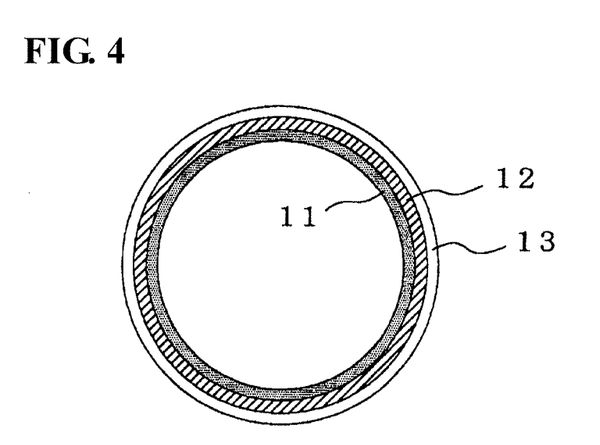
FIG. 4 is a cross-sectional view illustrating another example of a layer structure of a fixing belt.

FIG. 3 is a cross-sectional view illustrating a fixing belt having a two-layer structure in which a fluororesin layer 13 is formed on an outer circumferential surface of a polyimide tube 11. FIG. 4 is a cross-sectional view illustrating a fixing belt having a three-layer structure in which a fluororesin layer 13 is formed on an outer circumferential surface of a polyimide tube 11 with an adhesive layer 12 therebetween. Furthermore, a layer other than the adhesive layer, for example, a resin layer or a rubber layer, may be additionally provided as the interlayer.

EXAMPLES

A description will be made using Examples and Comparative Examples, but the scope of the present invention is not limited to the Examples described below. First, raw materials used in Examples and Comparative Examples will be described.

As polyimide precursor varnishes, the following varnishes were used.
- U-varnish S-301: manufactured by Ube Industries, Ltd., specific gravity 1.446; a varnish produced by dissolving a polyimide precursor that forms the polyimide resin A including the repeating unit represented by formula (A) above (polyimide resin having good rigidity) in a solvent (N-methylpyrrolidone) in a concentration of 18% (hereinafter represented by an abbreviation of "U-varnish S")
- Pyre ML RC-5019: manufactured by I. S. T Corporation; a varnish produced by dissolving a polyimide precursor that forms the polyimide resin C including the repeating unit represented by formula (C) above (soft polyimide resin having good flexibility) in a solvent (N-methylpyrrolidone) in a concentration of 15% (hereinafter represented by an abbreviation of "Pyre ML")

As graphite, the following graphite products manufactured by Chuetsu Graphite Works Co., Ltd. were used.
- BF-3AK: particle size 3 µm
- BF-10AK: particle size 10 µm
- BF-40AK: particle size 30 µm As a highly conductive carbon black particle, granular carbon black "Ketjenblack EC-300J" manufactured by Ketjenblack International Corporation) was used (hereinafter represented by an abbreviation of "Ketjenblack").

As a CNT, "VGCF" or "VGCF-X" manufactured by Showa Denko K.K. was used.

VGCF: diameter 150 nmφ, length 8 μm, specific gravity 2.0
VGCF-X: diameter 15 nmφ, length 3 μm, specific gravity 2.0

Test methods and test conditions for the performance evaluation in Examples and Comparative Examples are as follows.

[Resistance]

An electrical resistance was measured by applying a tester to both ends (350 mm apart from each other) of a polyimide tube having a size of φ30×350 mm and a thickness of 100 μm. When the measured value was decreased to a stable value, the value was read. This value was defined as a resistance.

[MIT Test (Folding Endurance Test)]

A polyimide varnish dispersion liquid obtained in each of Examples and Comparative Examples was formed into a film, and was then heated to 400° C. to imidize a polyimide precursor. Thus, a film composed of a polyimide resin composition and having a thickness of 100 μm was formed. A ribbon having a width of 15 mm was cut from this film and used as a sample for the measurement. The number of reciprocating folding times until the prepared sample was broken was measured using a MIT folding endurance tester under the measurement conditions described below. The measurement was conducted five times, and the average was defined as a measurement value of the MIT test.

(Measurement Conditions)
    Angle: 45° (alternating displacement: 90°)
    Folding speed: 175 cpm
    Load: 300 g

[Offset Test Using Actual Apparatus]

The prepared polyimide tube is installed in an actual copying machine, and the occurrence or non-occurrence of offset is evaluated using the criteria described below.
    A: Offset does not occur.
    B: Offset does not substantially occur.
    C: Offset occurs but the offset is at a level that does not cause a problem.
    D: Offset occurs and the offset is at a level that causes a problem.

[Durability Evaluation Using Actual Apparatus]

The prepared polyimide tube is installed in an actual copying machine, and a paper-passing test is performed. The state of the polyimide tube after the paper-passing test is evaluated using the criteria described below.
    A: Breakage of the polyimide tube does not occur after 250,000 sheets are passed.
    B: Breakage of the polyimide tube does not occur after 200,000 sheets are passed. However, breakage is observed after 250,000 sheets are passed.
    D: Breakage is observed after 200,000 sheets or less are passed.

[Rigidity Test]

A load when a polyimide tube having a size of φ30×350 mm and a thickness of 100 μm was compressed to the half was measured using a tension and compression measuring device under the measurement conditions described below.
    Compression speed: 200 mm/min, Amount of compression: 15 mm, Maximum load: 10 N Examples and Comparative Examples To each of polyimide varnishes prepared by mixing U-varnish S and Pyre ML in a composition ratio (on a solid content basis; mass ratio) shown in Tables I to III, graphite, highly conductive carbon black particles, and CNTs were added in a composition (on a total solid volume basis; percent by volume when the volume of the solid (polyimide resins) in the varnish is assumed to be 100% by volume) shown in Tables I to III. The resulting mixture was preliminarily mixed in a mixer, blended using a three-roll mill, and then defoamed under vacuum. Thus, a polyimide varnish dispersion liquid containing the above components was obtained. The MIT test (folding endurance test) was conducted as described above using the polyimide varnish dispersion liquid. The results are shown in Tables I to III.

An aluminum column having an outer diameter φ of 20 mm, and the outer surface of which was coated with a ceramic, was used as a core body. A nozzle (discharge opening) set in a supply portion of a dispenser was brought into contact with the outer surface of the core body. A predetermined amount of the polyimide varnish dispersion liquid was constantly supplied to the outer surface of the core body from the nozzle of the supply portion of the dispenser while the core body was rotated and the nozzle was moved in a direction of the rotational axis of the core body at a constant speed. Thus, the polyimide varnish dispersion liquid was applied. A PTFE tube having an inner diameter of 2 mm was used as the nozzle of the supply portion of the dispenser. The nozzle was moved from a position (at the time of starting the supply) 20 mm from the right end of the core body to a position (at the time of stopping the supply) 20 mm from the left end of the core body.

After the application, the core body was heated stepwise to 400° C. while being rotated, and cooled. A coating film composed of a solidified polyimide resin was then detached as a tube from the core body. The polyimide tube obtained as described above had a thickness of 100 μm, an outer diameter of 30 mm, and a length of 350 mm. For the polyimide tube, the measurement of the resistance, the offset evaluation using an actual apparatus, and the durability evaluation using an actual apparatus were conducted by the methods described above. The results are shown in Tables I to III.

TABLE I

|  |  | Example 1 | Example 2 | Example 3 | Example 4 |
|---|---|---|---|---|---|
| Polyimide | U-varnish S | 60 | 60 | 60 | 40 |
|  | Pyre ML | 40 | 40 | 40 | 60 |
| Filler | BF-3AK | 30 | 40 | 40 | 40 |
|  | BF-10AK | — | — | — | — |
|  | BF-40AK | — | — | — | — |
|  | Ketjenblack | 10 | 10 | 5 | 5 |
|  | VGCF | — | — | — | — |
|  | VGCF-X | 1 | 1 | 2 | 2 |
| Resistance (Ω) |  | 19 | 13 | 18 | 18 |
| MIT test (times) |  | 15615 | 2175 | 2987 | 2191 |
| Offset evaluation using actual apparatus |  | B | A | B | B |
| Durability evaluation using actual apparatus |  | A | B | B | B |
| Rigidity test (N) |  | 1.87 | 1.74 | 2.07 | 1.67 |

TABLE II

|  |  | Comparative Example 1 | Comparative Example 2 | Comparative Example 3 | Comparative Example 4 | Comparative Example 5 |
|---|---|---|---|---|---|---|
| Polyimide | U-varnish S | 80 | 60 | 60 | 60 | 80 |
|  | Pyre ML | 20 | 40 | 40 | 40 | 20 |

TABLE II-continued

| | | Comparative Example 1 | Comparative Example 2 | Comparative Example 3 | Comparative Example 4 | Comparative Example 5 |
|---|---|---|---|---|---|---|
| Filler | BF-3AK | 50 | 50 | 50 | 50 | 40 |
| | BF-10AK | — | — | — | — | — |
| | BF-40AK | — | — | — | — | — |
| | Ketjenblack | — | — | — | — | 5 |
| | VGCF | 1 | 1 | — | 1 | — |
| | VGCF-X | — | — | — | — | 2 |
| Resistance (Ω) | | 20 | 20 | 26 | 22 | 17 |
| MIT test (times) | | 337 | 2524 | 2800 | 2250 | 662 |
| Offset evaluation using actual apparatus | | C | C | D | D | B |
| Durability evaluation using actual apparatus | | D | B | B | B | D |
| Rigidity test (N) | | 2.35 | — | — | — | 2.19 |

TABLE III

| | | Comparative Example 6 | Comparative Example 7 | Comparative Example 8 | Comparative Example 9 | Comparative Example 10 |
|---|---|---|---|---|---|---|
| Polyimide | U-varnish S | 100 | 80 | 80 | 80 | 80 |
| | Pyre ML | 0 | 20 | 20 | 20 | 20 |
| Filler | BF-3AK | 40 | — | 10 | — | — |
| | BF-10AK | — | 40 | 30 | — | 10 |
| | BF-40AK | — | — | — | 40 | 30 |
| | Ketjenblack | 5 | 5 | 5 | 5 | 5 |
| | VGCF | — | — | — | — | — |
| | VGCF-X | 2 | 2 | 2 | 2 | 2 |
| Resistance (Ω) | | 17 | 12 | 12 | 14 | 9 |
| MIT test (times) | | 207 | 444 | 659 | 655 | 20 |
| Offset evaluation using actual apparatus | | B | A | A | B | A |
| Durability evaluation using actual apparatus | | D | D | D | D | D |
| Rigidity test (N) | | 2.11 | 2.08 | 2.10 | 1.38 | 1.64 |

As shown in Table I, the polyimide tubes of Examples 1 to 4 (present invention examples) have low resistance. As a result, the results of the offset evaluation using the actual apparatus are also good, and thus good image properties are obtained. Furthermore, the measurement values of the MIT test are also large. As a result, the results of the durability evaluation using the actual apparatus are also good, and thus good durability is also obtained. These results show that the polyimide tubes of the present invention are good in terms of both image property and durability.

Referring to the results shown in Tables II and III, in Comparative Example I and Comparative Examples 5 to 10, in which the proportion of Pyre ML in the polyimide is 20% by mass or less, the measurement values of the MIT test are small, the durability evaluation using the actual apparatus is low, and thus durability is insufficient. On the other hand, in Comparative Examples 1 to 4, which do not contain Ketjenblack, the resistance is high, and the offset evaluation using the actual apparatus is also low.

INDUSTRIAL APPLICABILITY

The polyimide tube of the present invention can be used as a base of a fixing belt disposed in a fixing unit of an electrophotographic image-forming apparatus.

REFERENCE SIGNS LIST 1 fixing belt
2 heater
3 pressure roller
4 transfer-receiving material
5 unfixed toner image
6 fixed toner image
11 polyimide tube
12 adhesive layer
13 fluororesin layer
21 supply portion of dispenser
22 discharge opening
23 applied polyimide varnish dispersion liquid
24 core body

The invention claimed is:
1. A polyimide tube comprising:
a base resin containing a polyimide resin A including, as a main constitutional unit, a repeating unit represented by formula (A) below:

[Chem. 1]

(A)

and a polyimide resin B including, as a main constitutional unit, a repeating unit represented by formula (B) below:

[Chem. 2]

(B)

and/or a polyimide resin C including, as a main constitutional unit, a repeating unit represented by formula (C) below:

[Chem. 3]

(C)

in which a ratio (polyimide resin A):(polyimide resin B +polyimide resin C) is 30:70 to 70:30 in terms of mass ratio;
20% to 50% by volume of graphite; 3% by volume or more of a highly conductive carbon black particle; and 0.5% by volume or more of a carbon nanotube relative to the volume of the base resin,
the highly conductive carbon black particle is a carbon black particle in which a mixture prepared by mixing the carbon black particle with a high-density polyethylene resin in an amount of 10% by mass can have a volume resistance of 20 Ω cm or less.

2. The polyimide tube according to claim 1, wherein the ratio polyimide resin A:(polyimide resin B +polyimide resin C) is 50:50 to 60:40 in terms of mass ratio.

3. The polyimide tube according to claim 1, wherein 30% to 40% by volume of the graphite, 5% to 10% by volume of the highly conductive carbon black particle, and 1% to 3% by volume of the carbon nanotube are contained relative to the volume of the base resin.

4. The polyimide tube according to claim 1, having a thickness of 10 to 150 μm.

5. A method for producing the polyimide tube according to claim 1, the method comprising:
a step of making/bringing a discharge opening of a supply portion of a dispenser close to/into contact with an outer surface of a columnar core body or an outer surface or an inner surface of a cylindrical core body, and
while rotating the core body and relatively moving the discharge opening in a direction of a rotational axis of the core body,
forming a coating layer by continuously supplying a polyimide varnish from the discharge opening onto the outer surface of the columnar core body or the outer surface or the inner surface of the cylindrical core body;
after the formation of the coating layer, a step of solidifying the coating layer; and
after the solidification, a step of detaching the coating layer from the core body.

6. A fixing belt comprising a belt base including the polyimide tube according to claim 1, and a fluororesin layer disposed on an outer circumferential surface of the belt base either directly or with an adhesive layer therebetween.

* * * * *